United States Patent Office 3,026,300
Patented Mar. 20, 1962

3,026,300
POLYESTER FROM TRIMELLITIC ANHYDRIDE, GLYCOL AND ALKANOL
Benjamin A. Bolton, Gary, Ind., assignor to Standard Oil Company, Chicago, Ill., a corporation of Indiana
No Drawing. Filed Apr. 15, 1959, Ser. No. 806,454
4 Claims. (Cl. 260—77)

This invention relates to polyester resins derived from trimellitic anhydride, certain glycols, and certain alkanols; which resins are characterized by the ability to form hard durable films on baking at elevated temperatures.

In the preparation of resins by the polyesterification-condensation reaction using benzenetricarboxylic acid, it has been deemed necessary to convert one of the carboxyl groups prior to the condensation reaction with a glycol—this in order to avoid the forming of a cross-linked material. It has been discovered that by reacting trimellitic anhydride and glycol containing 2 to 9 carbon atoms under controlled conditions it is possible to produce a reaction product which can be further reacted with an alkanol containing from 3 to 13 carbon atoms to produce a polyester resin of a very low acid number. This product polyester resin is a superior material for use in preparation of surface coatings of the baked-finished type compared to the prior art resins wherein the trimellitic anhydride is first reacted with alkanol to form a di-functional material which is then condensed with glycol.

The polyester resin of the invention is prepared by (1) reacting a glycol containing from 2 to 9 carbon atoms and trimellitic anhydride, in an inert atmosphere and with continuous withdrawal of water produced in said reaction, at a temperature between about 100° C. and 240° C. for a time such that the acid number of the product is between about 180 and 240, (2) esterifying the product of (1) with an alkanol containing from 3 to 13 carbon atoms, said alkanol being present in the esterification zone in a molar ratio of "alkanol present to theoretical stoichiometric requirement" from 1 to about 30, at a temperature between about 100° C. and 240° C. with continuous withdrawal of water produced in said esterification, for a time to produce a polyester product of acid number on the order to 5–20, and (3) recovering said polyester product from said excess alkanol, and wherein the molar ratio of glycol:anhydride charged to said reaction is on the order of 1:1.

The glycols which are suitable for use in the preparation of the resin of the invention contain from 2 to 9 carbon atoms and include not only the simple glycols but also the ether glycols. Examples of suitable glycols are ethylene glycol, butylene glycol, nonandiol, diethylene glycol, tetraethylene glycol, and tripropylene glycol. The butylene glycols and diethylene glycols are particularly suitable.

The trimellitic anhydride and the defined glycol are reacted at moderate polyester reaction conditions which avoid any cross-linking reaction—this cross-linking reaction is commonly called gelation. The reaction is carried out in an inert atmosphere at a temperature between about 100° C. and 240° C. and water produced in the reaction is continuously withdrawn. In the case of lower boiling glycols or where the reaction is carried out in the presence of a non-reactive solvent, condenser means are provided for returning glycol and/or solvent to the reaction zone. The reaction is continued for a time determined by the temperature of reaction and the particular glycol charged. Most usually the reaction is continued until just short of the appearance of cross-linking as evidenced by an abrupt increase of viscosity of the material in the reaction zone.

The trimellitic anhydride and the glycol are charged in a molar ratio of glycol:anhydride on the order of 1:1, preferably a slight excess of glycol is charged—generally about 5–10 percent excess. At these ratios the reaction time is continued until the point of abrupt viscosity increase is reached, which point corresponds to an acid number of the product between about 180 and 240. (Acid number herein is the mg. of KOH used per g. of material.) It is to be understood that the acid number obtained at the completion of the reaction is dependent upon the excess of glycol charged and also upon the particular glycol charged.

The product polyester resin of the invention is prepared by further reaction of the anhydride-glycol product with an alkanol containing from 3 to 13 carbon atoms. Examples of suitable alkanols are propanol, butanol, octanol, 2-ethylhexanol, isotridecanol and mixtures of isomeric alcohols commercially available as Oxo alcohols commonly sold as, for example, isooctyl, isononyl, and isotridecyl alcohols.

The alkanol is used in at least the theoretical stoichiometric requirement, i.e., 1 mol per mol of trimellitic anhydride charged; however, it is preferred to operate with an excess of alkanol present in the final reaction zone hereinafter spoken of as "esterification zone." The molar ratio of "alkanol present to the theoretical stoichiometric requirement" is from 1 to about 30. It is preferred to have the "present: requirement" ratio from about 2 to 5. In other words, the esterification zone preferably contains from about 2 to 5 times the amount of alkanol theoretically required for reaction with the carboxyl groups present in the product of the glycol-trimellitic anhydride reaction.

The esterification zone is maintained at a temperature between about 100° C. and 240° C. and water produced is continuously withdrawn. The reaction is continued for the time needed to produce a polyester product which is substantially neutral; in general, it is preferred to have a polyester resin product of acid number on the order of 5–20.

The polyester product is readily recovered from the excess alkanol by distilling off the alkanol.

The polyester resin product of the invention is readily converted to hard tough thermoset solid by holding the resin on the order of a temperature of 300° F. to 400° F. for a time needed to complete the cross-linking reaction and the length of time to form the thermoset solid will be dependent upon the temperature and the dimensions of the object being heated.

The polyester resin product of the invention may be used for the formation of surface coatings by dissolving the resin in a suitable solvent. The liquid benzene hydrocarbons, such as toluene and xylene, are particularly suitable for this purpose. The solution is applied to the surface of the material to be protected and the resin is converted to a hard tough surface coating by baking, preferably at a temperature of about 300° F. for a time on the order of 30 minutes.

When it is desired to have a pigmented coating or the benefits of additional strength and reinforcement of inorganic materials, the solution of resin may be admixed with inorganic materials, such as carbonates and/or pigments such as titanium oxide or lead oxide. These mixtures are then applied to the surface to be protected and are baked to produce hard glossy enamel type finishes.

ILLUSTRATIONS

A polyester resin composed of approximately one mol of trimellitic anhydride, one mol of n-butyl alcohol, and one mol of 1,3-butylene glycol was prepared by three different procedures.

I 96 g. (.5 mol) of trimellitic anhydride plus 55.5 g. (.75 mol) of n-butyl alcohol were refluxed in a 5 neck flask equipped with stirrer, nitrogen sparge, thermometer, charge port and water trays for separating water of esterification from the refluxing butyl alcohol. When 2 cc. of water had been collected, 44 g. (.49 mol) of 1,3-butylene glycol was added. All of the butyl alcohol was allowed to distill over into the receiver. As processing continued, 4 more g. of 1,3-butylene glycol was added making a total of .535 mol added. A small amount of LiH was added during processing to encourage transesterification of butyl ester with glycol and thus build up the polyester.

The product resin had the following properties:

Acid number _____ 8.7.
Viscosity, Gardner _____ K (50% solids in xylene).
Color, Gardner _____ 4–5.

II

In the same equipment described above, 96 g. (.5 mol) of trimellitic anhydride and 42.7 g. (.575 mol) of n-butyl alcohol were reacted until .8 mol of $H_2O$ was collected. At this point, 45 g. (.5 mol) of 1,3-butylene glycol was added. The mixture was processed at about 200° C. to an acid number of 20.5. At this point, 4 more g. of the glycol was added. When the acid number reached 12, a small amount of LiH was added and the mix heated to 230° C. for about one hour. The product resin had the following properties:

Acid number _____ 9.2.
Viscosity, Gardner _____ E (47.9% solids in xylene).
Color, Gardner _____ 3.

III. The Resin of the Invention

In the equipment described in I, 96 g. of trimellitic anhydride and 50 g. (.55 mol) of 1,3-butylene glycol were heated at 150° C. to an acid number of 199. At this point, 140 ml. (approximately 3:1 ratio of OH to COOH) of n-butanol was added. The reaction mix was processed for twelve hours, distilling off alcohol to raise the temperature to 180° C. The product resin had these properties:

Acid number _____ 9.0.
Viscosity, Gardner _____ F–G (50% solids in xylene).
Color, Gardner _____ 2–3.

Pigmented Surface Coatings

The resins described in I, II, and III were pigmented as white baking enamels with rutile $TiO_2$. A commercial melamine formaldehyde resin (30 parts) was incorporated with total 70 parts polyester resin (solids). The ratio of pigment to resin solids was .9/1.0.

Films of these enamels were baked for 30 minutes at 300° F. in a circulating air oven. The following properties were obtained:

| Coating from Resin | I | II | III |
|---|---|---|---|
| Sward Hardness: | | | |
| 1 hour | 12.5 | 19.1 | 33.0. |
| 2 weeks | 17.0 | 22.8 | 35.6. |
| Pencil Hardness | F | H | 3H. |
| Flexibility (conical) | OK | OK | Broke at 5.76% elongation. |
| 10% NaOH Resistance | 6 hrs. | 4½ hrs. | 6 hrs. |
| Scrubability (gloss before/after after 150 strokes) | 71/26 | 77/32 | 79/33. |

These data indicate that by using the resin preparation procedure described in III, it is possible to obtain much higher enamel hardness. Coatings from resins I and II were more flexible because the resins were softer.

Thus having described the invention, what is claimed is:

1. A polyester resin prepared by (1) reacting 1,3-butylene glycol and trimellitic anhydride, in a mole ratio of about 1:1, in an inert atmosphere and with continuous withdrawal of water produced in said polyester reaction at a temperature on the order of 150° C. until the product has an acid number of about 199, (2) adding n-butanol to the glycol-anhydride product, in a mole ratio of butanol to anhydride charged of approximately 3, and condensing these at a temperature of about 180° C. with continuous withdrawal of water produced until the product has an acid number of about 9, and (3) removing excess butanol to recover a resin product.

2. A polyester resin prepared by (1) reacting a glycol having 2–9 carbon atoms and only carbon, hydrogen, and oxygen therein, and trimellitic anhydride, in a mole ratio of glycol to anhydride charged to said reaction on the order of 1:1, in an inert atmosphere at a temperature between about 100° and 240° C. with continuous withdrawal of water produced in said reaction, said reaction being continued for a time such that a product having an acid No. between about 180 and 240 is produced, (2) reacting the product of (1) with an alcohol of the type ROH where R is an alkyl group having 3–13 carbon atoms, in an inert atmosphere at a temperature between about 100° and 240° C. with continuous withdrawal of water produced in the reaction, the mole ratio of alcohol present to theoretical stoichiometric requirement for reaction with the free carboxyl groups present in the product of (1) being from about 2 to about 5 and the reaction being continued for a time sufficient to produce a polyester product having an acid No. on the order of 5–20, and (3) recovering said polyester product from excess alcohol.

3. The resin of claim 2 wherein said glycol is 1,3-butylene glycol.

4. The resin of claim 2 wherein said alcohol is n-butanol.

References Cited in the file of this patent

UNITED STATES PATENTS

| | | |
|---|---|---|
| 1,932,688 | Brubaker | Oct. 31, 1933 |
| 2,035,528 | Brubaker | Mar. 31, 1936 |
| 2,562,878 | Blair | Aug. 7, 1951 |

FOREIGN PATENTS

| | | |
|---|---|---|
| 881,823 | France | Feb. 4, 1943 |